(12) United States Patent
Kadle et al.

(10) Patent No.: US 6,915,646 B2
(45) Date of Patent: Jul. 12, 2005

(54) HVAC SYSTEM WITH COOLED DEHYDRATOR

(75) Inventors: Prasad Shripad Kadle, East Amherst, NY (US); James Allen Baker, Williamsville, NY (US); Mahmoud Ghodbane, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/602,380

(22) Filed: Jun. 24, 2003

(65) Prior Publication Data

US 2004/0003624 A1 Jan. 8, 2004

Related U.S. Application Data

(60) Provisional application No. 60/393,271, filed on Jul. 2, 2002.

(51) Int. Cl.[7] ............................................... F25D 17/06
(52) U.S. Cl. ............................... 62/96; 92/503; 92/513
(58) Field of Search ........................... 62/503, 509, 513, 62/244, 96, 3.2

(56) References Cited

U.S. PATENT DOCUMENTS

| | | | | |
|---|---|---|---|---|
| 4,236,381 A | * | 12/1980 | Imral et al. ................. | 62/324.1 |
| 5,052,193 A | * | 10/1991 | Pettitt et al. .................. | 62/503 |
| 5,269,146 A | * | 12/1993 | Kerner .......................... | 62/3.6 |
| 5,347,829 A | * | 9/1994 | Newman ....................... | 62/474 |
| 5,481,884 A | * | 1/1996 | Scoccia ........................ | 62/129 |
| 5,722,146 A | * | 3/1998 | Seigle et al. .................. | 29/446 |
| 6,293,115 B1 | * | 9/2001 | Forrest et al. ................ | 62/186 |
| 6,319,841 B1 | * | 11/2001 | Bergman et al. ............ | 438/706 |
| 6,357,242 B1 | * | 3/2002 | Farley et al. ................. | 62/133 |
| 6,389,842 B1 | * | 5/2002 | Telesz et al. ................. | 62/503 |
| 6,508,408 B2 | * | 1/2003 | Kelly et al. ............... | 236/91 C |
| 6,659,727 B2 | * | 12/2003 | Major et al. .................. | 417/16 |

FOREIGN PATENT DOCUMENTS

| | | | | |
|---|---|---|---|---|
| JP | 362026491 A | * | 2/1987 | |
| JP | 410078274 A | * | 3/1998 | |
| JP | 02002031456 A | * | 1/2002 | |

\* cited by examiner

*Primary Examiner*—William Doerrler
*Assistant Examiner*—Mohammad M. Ali
(74) *Attorney, Agent, or Firm*—Patrick M. Griffin

(57) ABSTRACT

An air conditioning system for a vehicle includes an accumulator/dehydrator (A/D) disposed in the suction fluid line for accumulating refrigerant and a heat transfer jacket surrounds the A/D for exchanging heat with the A/D and the refrigerant therein. The heat transfer jacket may define a space between an inner wall of the A/D and an outer wall spaced therefrom with a heat transfer media disposed in the space for cooling by extracting heat from the refrigerant in the A/D. Alternatively, the jacket is defined by a double walled sleeve surrounding the A/D and defining the space for the heat transfer media. Yet another alternative is for the heat transfer jacket to comprise a thermoelectric device.

10 Claims, 1 Drawing Sheet

US 6,915,646 B2

HVAC SYSTEM WITH COOLED DEHYDRATOR

RELATED APPLICATION

This application claims the priority of provisional application No. 60/393,271 filed Jul. 2, 2002.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Also, such systems utilize various valve arrangements for controlling flow through the system during operation and during shutdown and/or in response to a leak of refrigerant in the system. In addition, an accumulator/dehydrator is frequently disposed in the suction line for accumulating refrigerant. The refrigerant leaving the evaporator and accumulated in the accumulator/dehydrator is normally at a low temperature.

SUMMARY OF THE INVENTION AND ADVANTAGES

The subject invention relates to the cooling of such an accumulator/dehydrator (A/D) during shut down by surrounding the A/D with a heat transfer jacket and exchanging heat with the A/D and the refrigerant therein.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
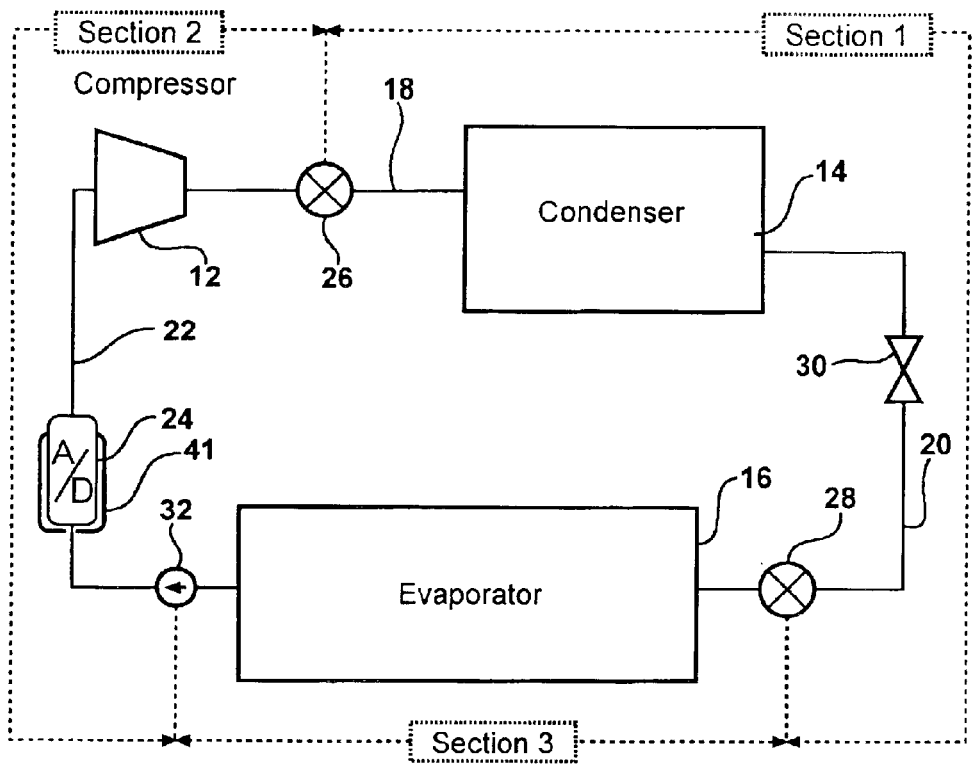
FIG. 1 is a schematic view of an air conditioning system employing the subject invention.

As alluded to above the subject invention relates to an air conditioning system for a vehicle that comprises a compressor 12 for compressing a refrigerant, a condenser 14 for condensing the refrigerant, and an evaporator 16 for evaporating the refrigerant. Of course, a discharge fluid line 18 interconnects the compressor 12 and the condenser 14, while a liquid fluid line 20 interconnects the condenser 14 and the evaporator 16, and a suction fluid line 22 interconnects the evaporator 16 and the compressor 12. As will be appreciated the various components are not proportional as they are shown schematically.

As is well known in the art, an accumulator/dehydrator (A/D) 24 is disposed in the suction fluid line 22 for accumulating refrigerant.

In addition, various valves are included for controlling the flow of refrigerant through the system. A first solenoid-operated valve 26 is moved between open and closed positions to control fluid flow in the suction fluid line 18 between the compressor 12 and the condenser 14. A second solenoid-operated valve 28 is moved between open and closed positions to control fluid flow in the liquid fluid line 20 between the condenser 14 and the evaporator 16. A thermal expansion device 30 is also disposed in the liquid fluid line 20 between the condenser 14 and the evaporator 16. A check valve 32 is disposed in the suction fluid line 22 between the evaporator 16 and the A/D 24.

These valves divide the system into three sections with section one extending between the first 26 and second 28 solenoid valves, section two extending between the check valve 32 and the first solenoid valve 26, and section three extending between the valves on either side of the evaporator 16, i.e., the second solenoid valve 28 and the check valve 32. Accordingly, section three consists primarily of the evaporator 16. This section three serves to isolate the evaporator 16 in the "off" mode. In general, the vehicle sits idle for very long periods of time. In case of a leak out of the evaporator 16, this minimal charge will be released into the passenger compartment but will not pose any safety hazard because of the low internal volume of section three. The check valve 32 is provided to allow the flow of refrigerant out of the evaporator 16 and into the A/D 24 when the system is shut down. The A/D 24 has high internal volume and typically holds the reserve charge in the system. This reserve charge allows the system to operate without any loss of performance in transient situations. The A/D 24 would be strategically placed such that its integrity would not be breached in most collisions (typically between the engine and the dash); a heat transfer jacket surrounding the A/D 24 for exchanging heat with the A/D 24 and the refrigerant therein.

In accordance with the subject invention a heat transfer jacket is disposed to surround the A/D 24 for exchanging heat with the A/D 24 and the refrigerant therein. By rendering the A/D 24 cold a natural pull is established into the A/D 24 because refrigerant tends to migrate to the coldest points in the system. The heat transfer jacket defines a space surrounding the A/D 24 and a heat transfer media 34 is disposed in the space for cooling by extracting heat from the refrigerant in the A/D 24. If the vehicle has just been turned off, the fluid in the jacket will be cold and will cool the refrigerant going into the compressor 12 which will help the thermodynamic cycle. If the vehicle has been shut down for a long time, the fluid in the jacket will be cooled down, robbing some of the heat from the refrigerant in the A/D 24 which degrades the cycle.

Figure 2:
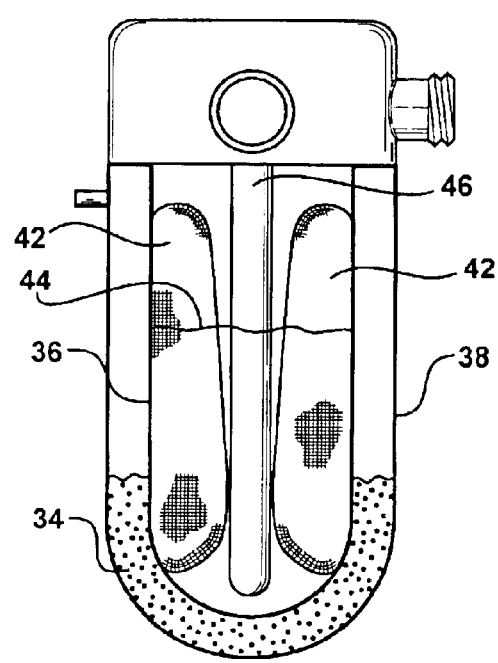
FIG. 2 is a cross sectional view of an accumulator/dehydrator having a double walled construction to implement the subject invention.
Figure 3:
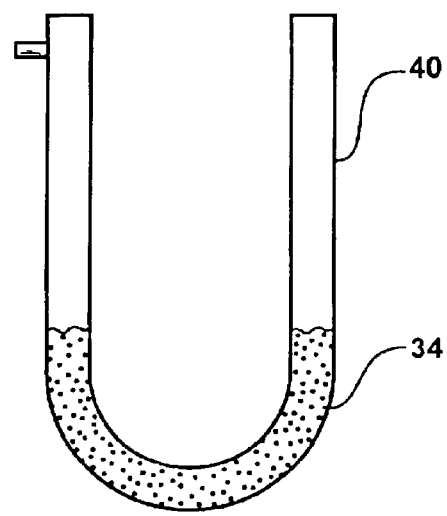
FIG. 3 is a cross sectional view of a sleeve to surround the accumulator/dehydrator to implement the subject invention.

In the embodiment of FIG. 2, an inner wall 36 of the A/D 24 defines the space and an outer wall 38 is spaced therefrom. In the embodiment of FIG. 3 the jacket is defined by a double walled sleeve 40 for surrounding the A/D 24 and defining the space between the walls thereof. The sleeve 40 is like a double walled sock. Alternatively, the heat transfer jacket may comprise a thermoelectric device 41 in place of the sleeve 40 but powered by electrical current from the vehicle battery. In this case, cooling could be provided at all times helping the thermodynamic cycle during operation.

The well-known desiccant bag 42 is shown in FIG. 2 along with the standpipe 46 and the normal level of refrigerant 44 when the system is operational. The double-walled 36 and 38 A/D 24 provides an internal volume that is partially filled with a two-phase material 34 that is carefully selected such that its evaporation allows a maximum amount of heat capacity for the given volume. During normal operation of the vehicle, this two-phase material 34 is cooled down into either solid or liquid phase by giving up heat to the refrigerant 44 that is flowing through the A/D 24. This two-phase material 34 will reach an equilibrium point with the internal refrigerant 44. When the system is turned off, the two-phase material 34 will allow the A/D 24 to stay colder for a longer time allowing more refrigerant 44 to be pulled out of the evaporator 16 and into the A/D 24 through the check valve 32.

Another function of the double walled A/D 24 is to allow the A/D 24 to retain its contents under more severe collision conditions.

It should be understood that the double-walled space could be filled with any heat transfer media 34 such as a water/glycol solution.

In the embodiment of FIG. 3, the standard A/D 24 could be used with a slip-on plastic double-walled jacket or sleeve 40. This could be a metal or other non-metallic piece. Again the space between the two walls of the jacket 40 would be filled with the appropriate amount of two-phase material 34 or heat transfer fluid. This jacket or sleeve 40 would fit snugly over the bottom of the A/D 24 allowing it to function in a similar fashion as the A/D 24 shown in FIG. 2.

In both FIGS. 2 and 3, the heat transfer material 34 is inserted into the space between the walls through a charging port. Also, the level of fluid will be higher if single phase liquid material 34 is used.

Accordingly, the invention also provides a method of operating such an air conditioning system of the type including an accumulator/dehydrator A/D 24 disposed in the suction fluid line 22 for accumulating refrigerant wherein the method includes the steps of surrounding the A/D 24 with a heat transfer jacket and exchanging heat with the A/D 24 and the refrigerant therein. More specifically, the method is further defined as surrounding the A/D 24 with a space and disposing a heat transfer media 34 in the space for cooling by extracting heat from the refrigerant in the A/D 24. Disposing an outer wall 38 about an inner wall 36 of the A/D 24 to provide the space may do this. Alternatively, this may be done by disposing a double walled sleeve 40 about the A/D 24 to define the space between the walls thereof or disposing a thermoelectric device about the A/D 24 to define the jacket.

Obviously, many modifications and variations of the present invention are possible in light of the above teachings. The invention may be practiced otherwise than as specifically described within the scope of the appended claims.

What is claimed is:

1. An air conditioning system for a vehicle comprising:
   a compressor for compressing a refrigerant,
   a condenser for condensing the refrigerant,
   an evaporator for evaporating the refrigerant,
   a discharge fluid line interconnecting the compressor and said condenser,
   a liquid fluid line interconnecting said condenser and said evaporator,
   a suction fluid line interconnecting said evaporator and said compressor,
   an accumulator/dehydrator (A/D) disposed in said suction fluid line for accumulating refrigerant, and
   a heat transfer jacket surrounding said A/D and including a heat transfer media independent of the refrigerant in the system for exchanging heat with said A/D and the refrigerant in the system.

2. A system as set forth in claim 1 wherein said heat transfer jacket defines a space surrounding said A/D and said heat transfer media is disposed in said space for cooling by extracting heat from the refrigerant in said A/D.

3. A system as set forth in claim 2 wherein said space is defined by an inner wall of said A/D and outer wall spaced therefrom.

4. A system as set forth in claim 2 wherein said jacket is defined by a double walled sleeve surrounding said A/D and defining said space between said walls thereof.

5. A system as set forth in claim 1 wherein said heat transfer media comprises a thermoelectric device.

6. A method of operating an air conditioning system of the type including a compressor for compressing a refrigerant, a condenser for condensing the refrigerant, an evaporator for evaporating the refrigerant, a discharge fluid line interconnecting the compressor and the condenser, a liquid fluid line interconnecting the condenser and the evaporator, a suction fluid line interconnecting the evaporator and the compressor, and an accumulator/dehydrator A/D disposed in the suction fluid line for accumulating refrigerant, said method comprising the steps of surrounding the A/D with a heat transfer jacket and exchanging heat with the A/D and the refrigerant therein independently of the refrigerant in the system.

7. A method as set forth in claim 6 further defined as surrounding the A/D with a space and disposing a heat transfer media in the space for cooling by extracting heat from the refrigerant in the A/D.

8. A method as set forth in claim 7 further defined as disposing an outer wall about an inner wall of the A/D to provide the space.

9. A method as set forth in claim 7 further defined as disposing a double walled sleeve about the A/D to define the space between the walls thereof.

10. A method as set forth in claim 6 further defined as disposing a thermoelectric device about the A/D to define the jacket.

* * * * *